US 6,687,104 B2

(12) United States Patent
Aiello

(10) Patent No.: US 6,687,104 B2
(45) Date of Patent: Feb. 3, 2004

(54) ALGORITHM FOR DETECTING FAULTS ON ELECTRICAL CONTROL LINES

(75) Inventor: Frank Joseph Aiello, Canton, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 10/121,355

(22) Filed: Apr. 12, 2002

(65) Prior Publication Data

US 2003/0193769 A1 Oct. 16, 2003

(51) Int. Cl.$^7$ ................................................ H02H 3/00
(52) U.S. Cl. ........................ 361/93.1; 361/115; 361/62
(58) Field of Search .............................. 361/93.1, 115, 361/62, 64, 66, 87

(56) References Cited

U.S. PATENT DOCUMENTS

| | | | | |
|---|---|---|---|---|
| 4,106,013 A | * | 8/1978 | Cronin | 340/971 |
| 5,136,222 A | * | 8/1992 | Yamamoto et al. | 318/568.2 |
| 5,177,657 A | * | 1/1993 | Baer et al. | 361/45 |
| 6,198,613 B1 | * | 3/2001 | Rozman | 361/93.1 |
| 6,252,751 B1 | * | 6/2001 | Rozman | 361/23 |

OTHER PUBLICATIONS

Infineon Technologies Application Data Sheet, TLE 4207, Dec. 5, 2000, pp. 1–13.
Frank Heinrichs, Infineon Technologies Application Note, V 1.0, Aug. 2001, ANPS060, pp. 1–11.

* cited by examiner

*Primary Examiner*—Bao Q. Vu
(74) *Attorney, Agent, or Firm*—Brinks Hofer Gilson & Lione

(57) ABSTRACT

A method for detecting faults in an electrical system having a plurality of control lines and an error indicator line is disclosed. This method determines which of the plurality of control lines are active and whether the error flag line is indicating that a fault is present. One of the plurality of control lines is deactivated when the error flag line is indicating that a fault is present. Further, the method re-determines whether the error flag line is indicating a fault is present and then determines that a fault is present on the deactivated control line when the error flag line indicates that a fault is not present. In a further aspect of the present invention, the method re-activates the deactivated control line when the error flag line indicates that the fault is still present. These steps are repeated until the control line having a fault is identified.

13 Claims, 4 Drawing Sheets

ALGORITHM FOR DETECTING FAULTS ON ELECTRICAL CONTROL LINES

TECHNICAL FIELD

The present invention relates to methods for detecting and diagnosing electrical faults in electrical control systems.

BACKGROUND

The early detection and diagnosis of electrical faults in electronic components and control systems is extremely beneficial to the overall system operation. A short circuit (i.e. a short to ground or a short to supply) on one of the system's control lines could damage a driver or other components connected to that control line causing a more pronounced system failure.

Prior art integrated circuits typically incorporate event or fault detection strategies. Half bridge drivers offered by Infineon Corporation such as, the TLE 4207 dual half bridge driver, typically are used to control the operation of DC motors and are an example of a circuit having fault detection capability. This motor driver has built-in features such as diagnosis, over and under voltage lock-out, short circuit protection and over temperature protection to reduce the damage caused by a failure. An error flag is provided as an output of this driver device for detecting and diagnosing electrical faults on the two outputs of the device. For example, if the error flag is set high, then no error has been detected. If the error flag is set low, then there is an over temperature fault or an over voltage fault present.

While prior art fault detection schemes achieve their intended purpose, particular applications required improve diagnostic and fault detection methods. For example, the fault detection scheme implemented in Infineon's TLE 4207 device is only able to communicate whether a fault exists on the output control lines and not which one of the two output control lines the fault is present. In other words, this fault detection scheme does not indicate which output line has a fault associated with it.

In certain applications it is desirable to have each output line of a driver, such as the TLE 4207 dual half bridge driver, control a component or device, in contrast with the conventional approach, where two control lines are used to control one component. Unfortunately, present error or fault detection schemes do not provide an indication as to which control line is experiencing a fault.

Therefore, it would be desirable to have a new and improved method for detecting faults in electrical control lines. This method should provide the type and location of the fault. More specifically, the new and improved method should determine on which control line the fault exists.

SUMMARY

In an aspect of the present invention a method for detecting faults in an electrical system having a plurality of control lines and an error flag or indicator line is provided. This method determines which of the plurality of control lines are active and whether the error flag line is indicating a fault is present.

In another aspect of the presenting invention, one of the plurality of control lines is deactivated when the error flag line is indicating that a fault is present.

In another aspect of the present invention, the method re-determines whether the error flag line is indicating a fault is present and then determines that a fault is present on the deactivated control line when the error flag line indicates that a fault is no longer present.

In a further aspect of the present invention, the method re-activates the deactivated control line when the error flag line indicates that the fault is still present. These steps are repeated until the control line having a fault is identified.

These and other aspects and advantages of the present invention will become apparent upon reading the following detailed description of the invention in combination with the accompanying drawings.

DETAILED DESCRIPTION

Figure 1:
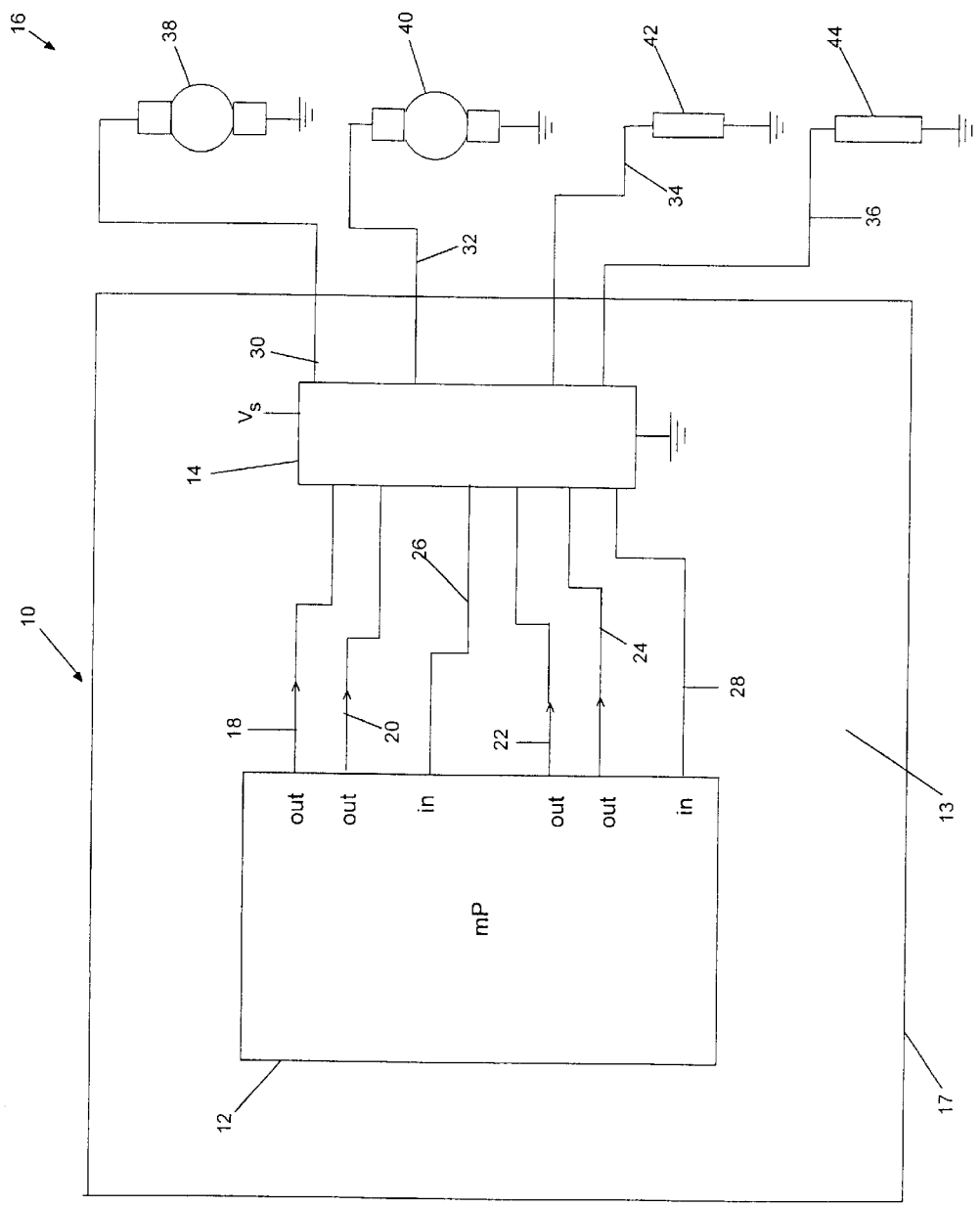
FIG. 1 is a schematic diagram of electrical control system for controlling the operation of a plurality of motors and actuators, in accordance with the present invention.

Referring now to FIG. 1, an electrical control system 10 is illustrated, in accordance with the present invention. Electrical control system 10 includes a processor 12, a driver circuit 14, and a plurality of controlled devices 16. Driver circuit 14 is shown and described herein as a dual driver circuit, however a single driver circuit having two outputs and an error flag input is also contemplated by the present invention. Furthermore, the present invention contemplates driver circuit 14 comprising multiple driver circuits such as three or more.

In the case of a dual driver circuit, processor 12 is in communication with driver circuit 14 via a plurality of output control lines 18, 20, 22 and 24. Additionally, processor 12 receives error or fault information on input lines 26 and 28. Driver 14 is in communication with the plurality of controlled components 16 via control lines 30, 32, 34 and 36. Controlled component 16 may include DC motors 38 and 40 as well as solenoid 42 and 44.

Processor 12 may be any suitable processor having the capability of executing software code and sending command signals to driver 14 to control the operation of the controlled components 16. Further, processor 12 should have an input port for receiving an error flag signal for diagnosing faults in the electrical control system. An example of such a processor or micro-controller is the C164 offered by Infineon Corporation. The motor driver or actuator driver 14 may be the motor driver device TLE 4207 or TLE 6208 family of drivers offered by Infineon Corporation or similar devices offered by other manufacturers (i.e. Motorola).

Figure 2A:
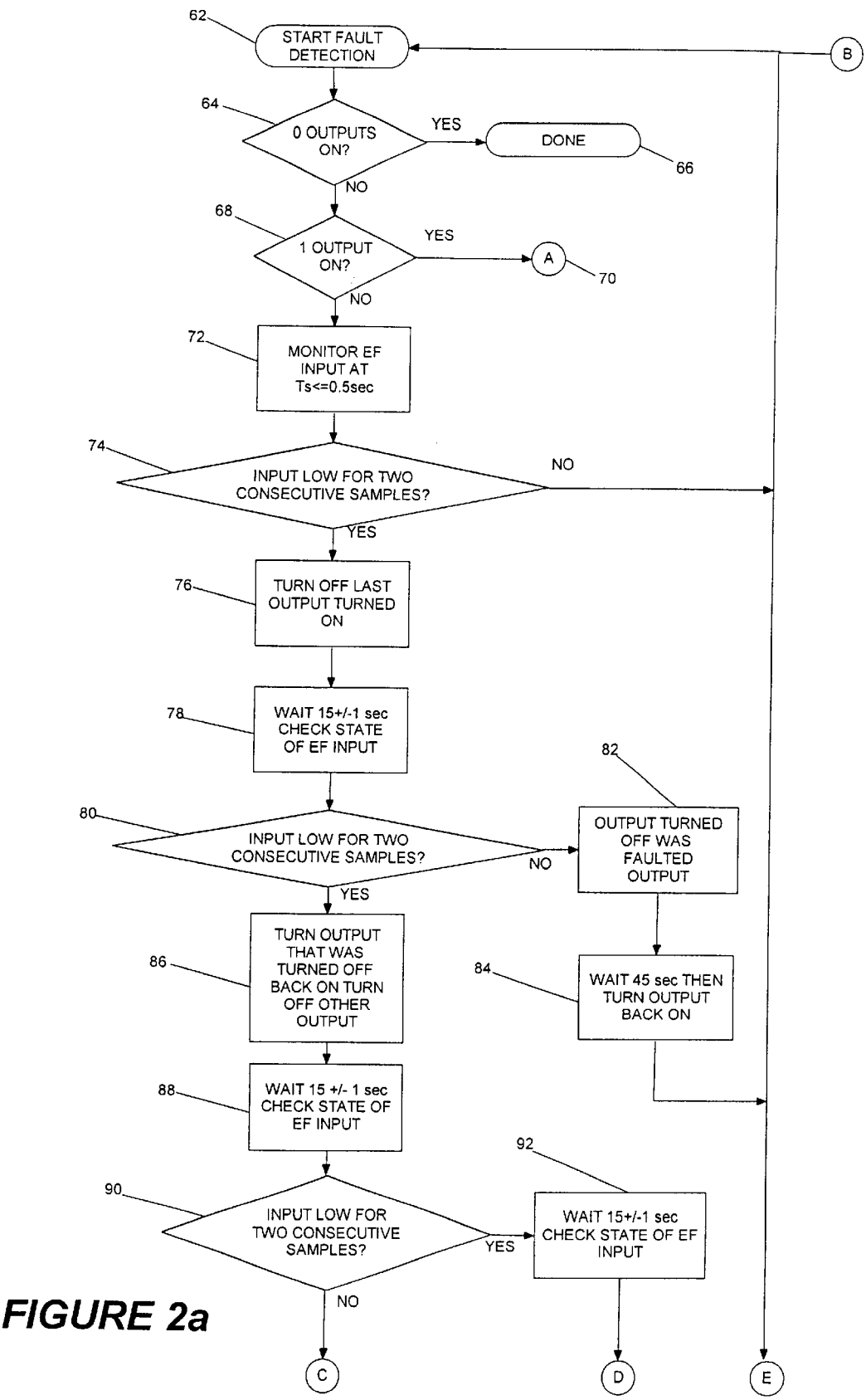
FIGS. 2a and 2b are a flow diagrams illustrating a method for detecting faults on the electrical control lines of the control system when more than one control line is active, in accordance with the present invention.
Figure 2B:
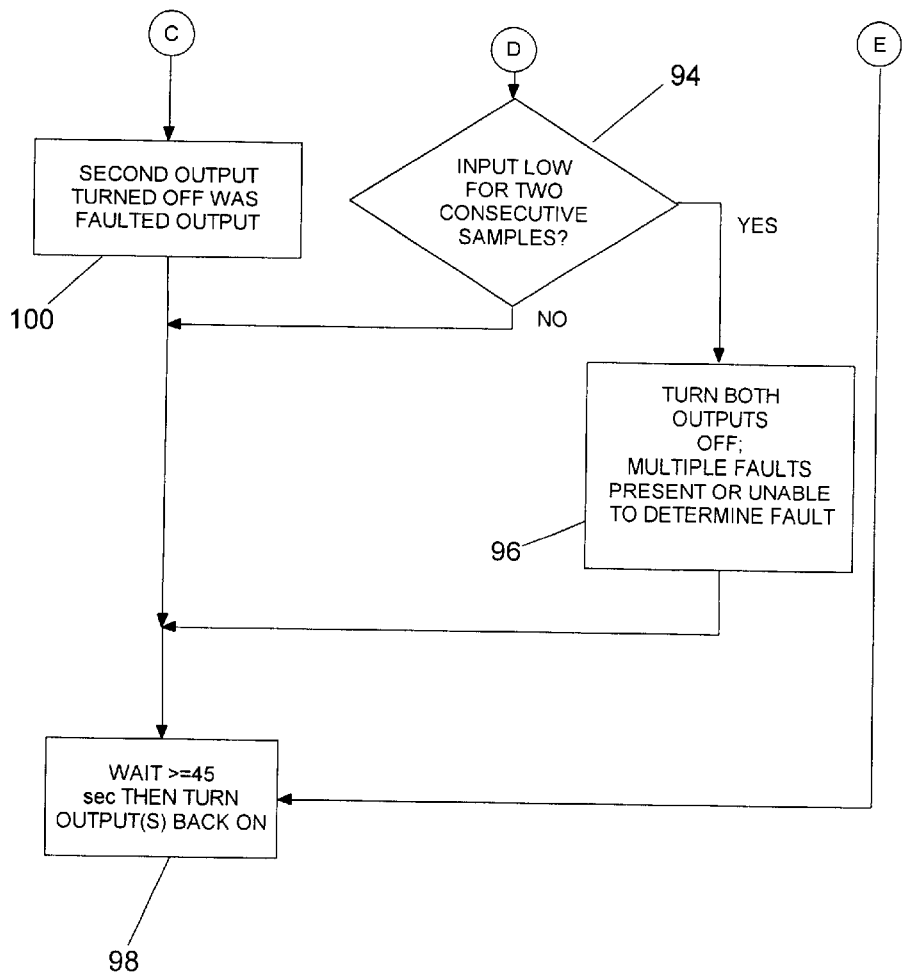
Figure 3:
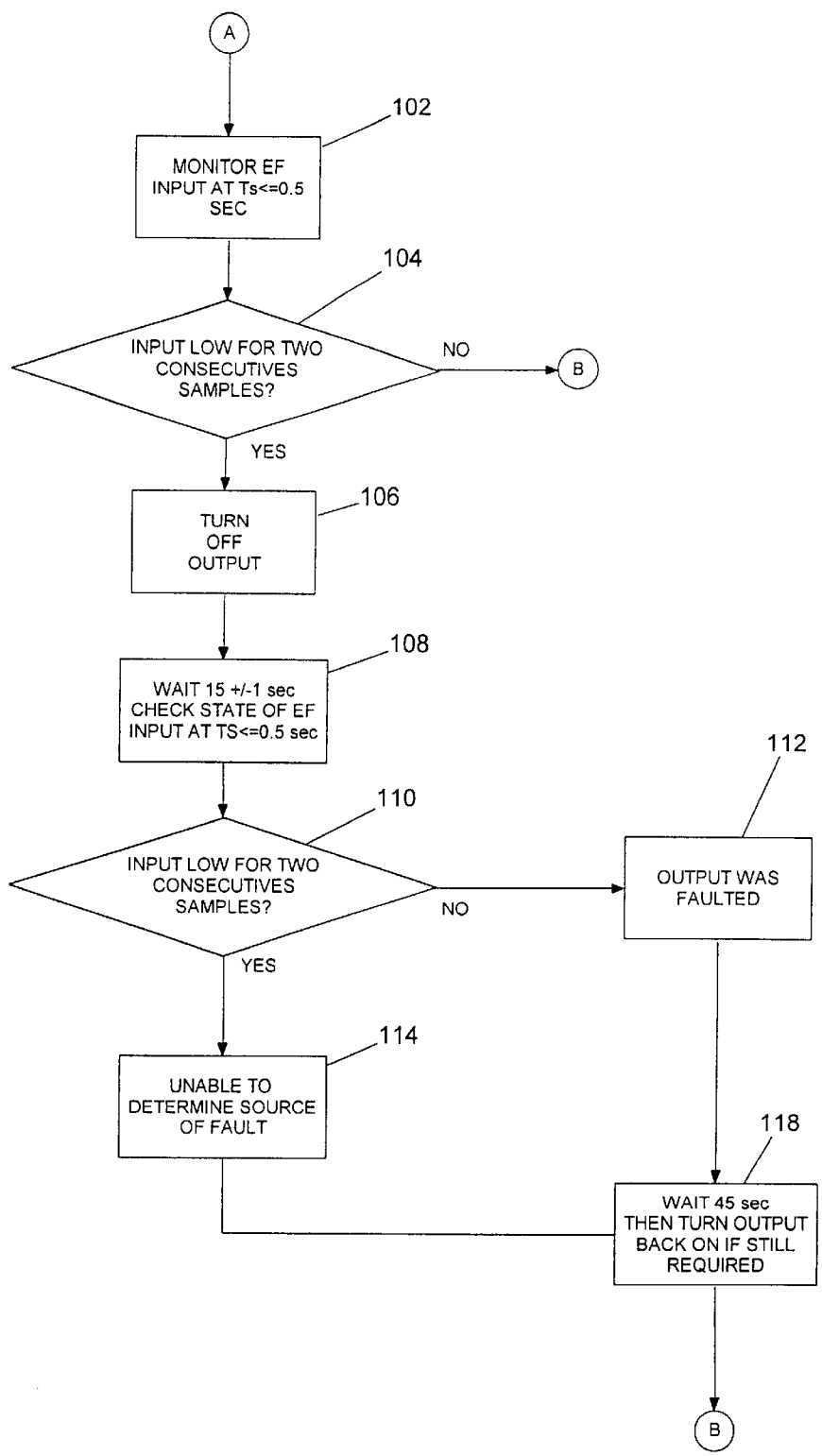
FIG. 3 is a flow diagram illustrating a method for detecting faults on the electrical control lines of the control system when only one control line is active, in accordance with the present invention.

Referring now to FIGS. 2a, 2b and 3, a method for detecting electrical faults on control lines 30, 32, 34 and 36 of electrical control system 10 is illustrated. At block 62, fault detection is initiated. At block 64, it is determined whether zero outputs are active or "on". If there are no outputs "on" then fault detection is concluded, as represented by bock 66. However, if at least one output is active then, as represented by block 68, the method determines if there is only one output active. As represented by block 70, if only one output is active the method continues in FIG. 3, as will be described hereinafter. However, if more than one output is on then, at block 72 input lines 26 and 28 are monitored to receive error flag information for a predefined period of time ($T_s$), such as 0.5 seconds.

At block 74, the method determines whether the error flag input has been at a low level for two consecutive samples, or an appropriate other number of consecutive samples as desired. If the error flag input is not at a low level for two consecutive samples, then the fault detection is reinitiated, as represented by block 74 and 62. However, if the error flag input has been low for two consecutive samples, at block 76 the last output turned "on" is turned "off". As represented by block 78, the system waits a predetermined amount of time, such as 15±1 seconds and then checks the error flag input, as represented by block 78.

The wait or delay time (i.e. 15 seconds) allows the driver to stabilize or cool down (thermal time constant to run out) after the device is overheated by the fault condition. Further, the wait time helps to alleviate any long term effects, damage, and/or stress caused of the fault condition on the driver. Of course, the thermal time constant for a device will vary, therefore an appropriate wait time should be selected based the particular characteristics of the device.

At block 80 the error flag input is monitored to determine whether the error flag input has been at a low level for two consecutive samples. If the error flag input has not been low for two consecutive samples, then the method determines that the output just turned off has the fault, as represented by block 82. At block 84, the method waits a predetermined amount of time such as 45 seconds and then turns the output just turned off back on.

However, if the error flag input has been low for two consecutive samples then, at block 86, the method turns the output that was just turned "off" back on and then turns "off" the other output. At block 88, the method waits for a predetermined amount of time, such as 15 seconds, and then checks the state of the error flag input. The method determines whether the error flag input has been low for two consecutive samples, at block 90. If the input has been low for two consecutive samples then, at block, 92, the method waits for a predetermined amount of time such as 15 seconds and checks the state of the error flag input again. If the error flag input is low for two consecutive samples, as determined at block 94, then both outputs are turned "off" and it is determined that multiple faults are present or that the fault is unable to be identified, as represented by block 96. At block 98, the method waits a predetermined amount of time, such as 45 seconds, and then turns the outputs back "on". However, if at block 90 the error flag input was not at a low level for two consecutive samples then the method identifies the second output turned off as the output that has a failure, as represented by block 100.

However, if at block 68 it is determined that only one output is "on", then the method monitors the error flag input every 0.5 seconds, as represented by block 102 in FIG. 3. At block 104, the method determines whether the error flag input has been low for at least two consecutive samples. If the error flag input has not been low for two consecutive samples, a fault detection is reinitiated at block 62. However, if the error flag input has been low for at least two consecutive samples, the one output that is turned "on" is turned "off", as represented by block 106. At block 108 the method waits for a predetermined amount of time which is 15 seconds and then checks the state of error flag input at a predetermined time interval, such as 0.5 seconds. The method then determines whether the error flag input has been at a low level for at least two consecutive samples. If it is determined, at block 110, that the input has not been low for at least two consecutive samples, then the one output is faulted, as represented by block 112 and then the method continues to block 118 where a predefined time delay (i.e. 45 sec.) is incorporated and then turns the output back "on" if the output is still required.

However, if the error flag input has been low for two consecutive samples, at block 114, it is determined that the source of the fault is unidentifiable. Next, at block 118 the method waits a predefined amount of time and then turns the output back "on" if the output is still required. Thereafter, the fault detection routine is reinitiated, as represented by block 62.

Thus, the present invention has many advantages and benefits over the prior art. For example, the present invention diagnoses faults on multiple control lines in an electrical control system utilizing only a single error fault line. Moreover, the present invention enables the electrical control system to deactivate or shut down only those portions of the control system that are experiencing an electrical failure. Therefore, the present invention provides increase failure diagnosis, control and improved overall system operation as compared to prior art fault detection systems and methods.

As any person skilled in the art of fault detection in electrical systems will recognize from the previous detailed description and from the figures and claims, modifications and changes can be made to the preferred embodiments of the invention without departing from the scope of this invention defined in the following claims.

What is claimed is:

1. A method for detecting faults in an electrical system having a plurality of control lines and an error indicator line, wherein the error indicator line indicates that there is a fault present on at least one of the plurality of control lines, the method comprising:

(a) determining whether the error indicator line is indicating that a fault is present;

(b) deactivating one of the plurality of control lines when the error indicator line is indicating that a fault is present;

(c) re-determining whether the error flag line is indicating a fault is present;

(d) determining that a fault is present on the deactivated control line when the error flag line indicates that a fault is not present;

(e) re-activating the deactivated control line when the error flag line indicates that the fault is still present; and (f) repeating steps (a) through (e) until the control line having a fault is identified.

2. The method of claim 1 further comprising determining which of the plurality of control lines are active.

3. The method of claim 1 further comprising determining how many control lines are active.

4. The method of claim 3 further comprising halting the fault detector method when no control lines are active.

5. The method of claim 1 further comprising monitoring the error flag line at predefined time intervals.

6. The method of claim 1 further comprising waiting a predefined period of time after deactivating the control line.

7. A method for detecting faults in an electrical system having a plurality of control lines and an error indicator line, wherein the error indicator line indicates that there is a fault present on at least one of the plurality of control lines, the method comprising:

(a) determining which of the plurality of control lines are active;

(b) determining whether the error flag line is indicating that a fault is present;
(c) deactivating one of the plurality of control lines when the error flag line is indicating that a fault is present;
(d) re-determining whether the error flag line is indicating a fault is present;
(e) determining that a fault is present on the deactivated control line when the error flag line indicates that a fault is not present;
(f) re-activating the deactivated control line when the error flag line indicates that the fault is still present; and
(g) repeating steps (a) through (f) until the control line having a fault is identified.

8. The method of claim 7 further comprising halting the fault detector method when no control lines are active.

9. The method of claim 7 further comprising monitoring the error flag line at predefined time intervals.

10. The method of claim 7 further comprising waiting a predefined period of time after deactivating the control line.

11. A method for detecting faults in an electrical system having a plurality of control lines and an error indicator line, wherein the error indicator line indicates that there is a fault present on at least one of the plurality of control lines, the method comprising:

(a) determining which of the plurality of control lines are active;
(b) monitoring the error flag line at predefined time intervals;
(b) determining whether the error flag line is indicating that a fault is present;
(c) deactivating one of the plurality of control lines when the error flag line is indicating that a fault is present;
(h) re-determining whether the error flag line is indicating a fault is present;
(i) determining that a fault is present on the deactivated control line when the error flag line indicates that a fault is not present;
(j) re-activating the deactivated control line when the error flag line indicates that the fault is still present; and
(k) repeating steps (a) through (f) until the control line having a fault is identified.

12. The method of claim 11 further comprising halting the fault detector method when no control lines are active.

13. The method of claim 11 further comprising waiting a predefined period of time after deactivating the control line.

* * * * *